United States Patent

[11] 3,601,026

| [72] | Inventor | Helmut Ettischer<br>Ruit/Krs. Esslingen, Germany |
|---|---|---|
| [21] | Appl. No. | 744,968 |
| [22] | Filed | July 15, 1968 |
| [45] | Patented | Aug. 24, 1971 |
| [73] | Assignee | Eastman Kodak Company<br>Rochester, N.Y. |

[54] SINGLE-LENS REFLEX CAMERA
10 Claims, 5 Drawing Figs.

[52] U.S. Cl. .................................................. 95/42, 95/63
[51] Int. Cl. .............................................. G03b 19/12
[50] Field of Search ........................................ 95/42, 53, 58, 59, 63

[56] References Cited
UNITED STATES PATENTS

| 3,094,913 | 6/1963 | Morelle | 95/42 |
| 3,158,075 | 11/1964 | Ohara | 95/42 |
| 3,165,992 | 1/1965 | Ando | 95/42 |

Primary Examiner—Samuel S. Matthews
Assistant Examiner—Richard L. Moses
Attorneys—Robert W. Hampton and Ronald S. Kareken ABSTRACT: An operating mechanism for a single-lens reflex camera has a slidable control member to which are coupled a shutter setting mechanism, a mirror-actuating mechanism, and a shutter blade retaining lever. Displacement of the control member from an initial position synchronously effects the closing of the shutter and the movement of the mirror to a viewing position prior to exposure, the operation of the shutter to make an exposure, and the activation of the previously deactive retaining lever to prevent rebounding of the shutter blades. The control member is then returnable to its initial position whereby it resets the operating mechanism.

HELMUT ETTISCHER
INVENTOR

Patented Aug. 24, 1971

HELMUT ETTISCHER
INVENTOR

BY
ATTORNEYS

HELMUT ETTISCHER
INVENTOR

HELMUT ETTISCHER
INVENTOR

SINGLE-LENS REFLEX CAMERA

BACKGROUND OF THE INVENTION

1. Field of the Invention

This invention relates to cameras and, more particularly, to actuating means for a single-lens reflex camera.

2. Description of the Prior Art

Single-lens reflex cameras provide the advantage that the same aperture is used for both viewing the subject and taking the picture. However, to achieve this result, it is necessary that the single-lens reflex camera perform a number of functions in addition to the usual film transporting and shutter operating functions. For example, the reflecting mirror, the cover plate for the film gate, the diaphragm vanes and the shutter blades must be moved or controlled in a cyclic manner in order to move them between their respective viewing positions and their respective picture-taking positions. This presents especially difficult engineering problems because of the given spatial relations and the intricate play of forces between the masses to be moved.

Known arrangements for carrying out these operations have certain disadvantages. In one arrangement, a spring mechanism is tensioned via a transmission upon actuation of the film transport lever, and after release of the spring mechanism by a trigger member, the necessary functions are carried out through a second transmission. In this arrangement, which requires substantial space, the cams for the respective functions must also be carefully coordinated, requiring additional operations and costs. Moreover, when the energy required for carrying out the various functions is derived from the shutter release movement, the additional energy required for the numerous functions could affect shutter reliability.

In another arrangement, which in part eliminates the disadvantages resulting from a shutter trigger mechanism having too many additional functions, a coupling is provided between the film transport and shutter-cocking mechanism on the one hand and the mirror control device with the shutter and diaphragm controlling means on the other hand. The coupling is associated with a lever such that the impulse transmitted to the shutter can be very small as it is only for control purposes, other energy storing means being employed to supply the actual energy for effecting movement of the various elements. This other energy storing means may employ a control slider provided with cams, slots, grooves or the like to close the cover plate, move the mirror and enable the shutter blades to open in addition to the diaphragm. However, known mechanisms for carrying out this purpose are relatively expensive, require a large amount of energy and are susceptible to wear.

SUMMARY OF THE INVENTION

The present invention comprises new and improved means for controlling movement of the various operating parts of a single-lens reflex camera.

According to the present invention, a slidable control member is mounted to effect, during its working cycle and in correct sequence, closing movement of the shutter blades (required prior to the exposure), and release of the shutter blade retaining lever. The shutter blade retaining lever is disposed at the shutter and normally is maintained in disengaged relation to the shutter drive mechanism but is released by the control member to move to its operative position. After the exposure has been made, the control member operates to disengage the retaining lever from the shutter drive mechanism and maintain the same in its normal, disengaged relation, move the mirror to its viewing position and then reopen the shutter blades, so that to object can be viewed again. This ensures a reliable synchronous movement of the shutter components and the associated camera elements, both during the release phase and the phase in which the mirror is returned to its viewing position. The losses due to friction are low, so that neither the shutter is disadvantageously stressed, and substantial resilient forces are not stored in the camera, and thus, actuation of the film transport handle, for instance, is less difficult.

The invention as well as objects and the attendant advantages thereof will become apparent from the following detailed description of a preferred embodiment of the invention.

BRIEF DESCRIPTION OF THE DRAWINGS

In the detailed description, reference is made to the accompanying drawings, forming part of the description and wherein.

DESCRIPTION OF THE PREFERRED EMBODIMENT

Because photographic cameras are well known, the present description will be limited to those elements forming part of or cooperating directly with the present invention, the elements of a camera not shown or described herein being understood to be selected from those known in the art.

Figure 1:
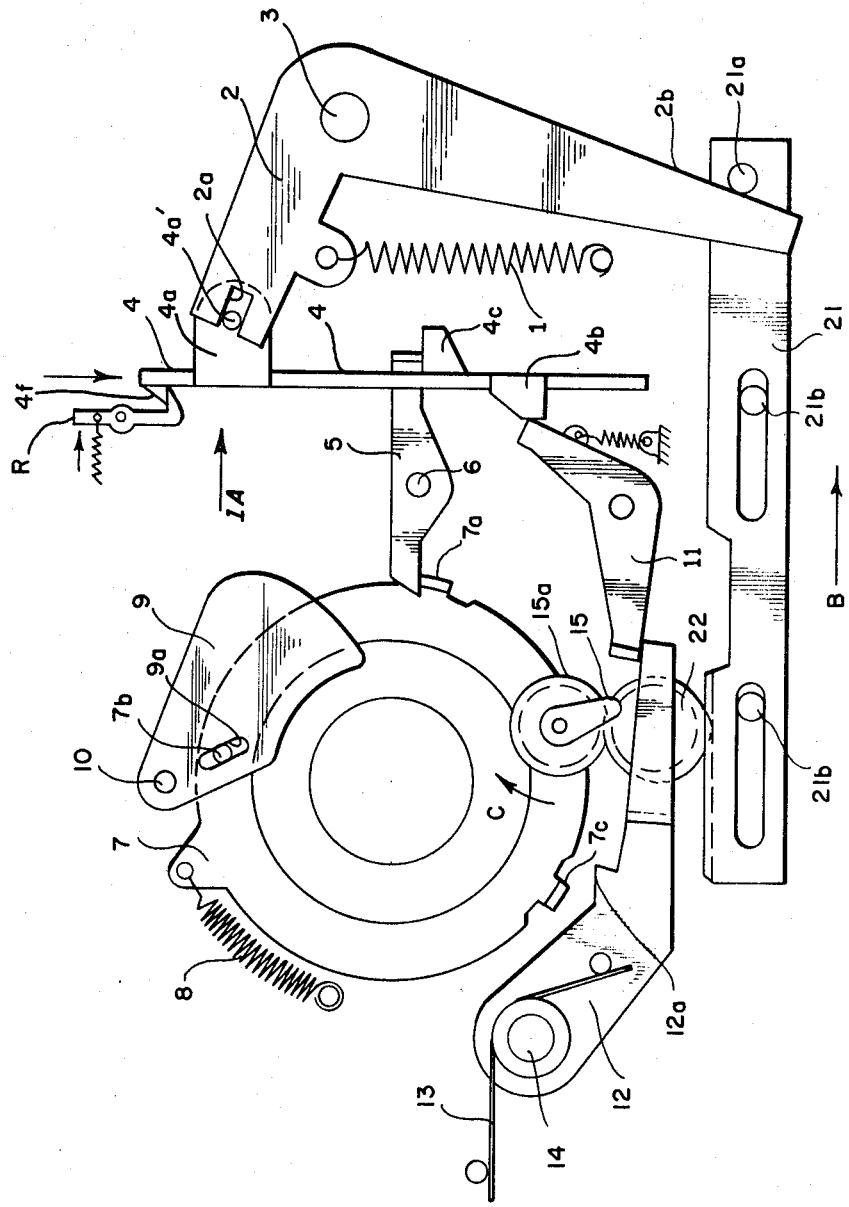
FIG. 1 schematically shows the various elements of the control mechanism according to the preferred embodiment and when the camera is in the viewing position.
Figure 1A:
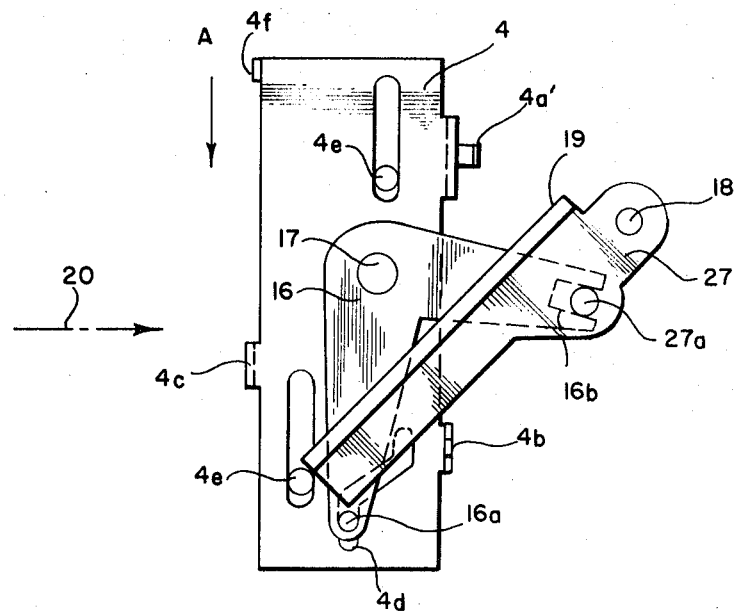
FIG. 1a shows a portion of the arrangement as shown in FIG. 1, taken in the direction of the arrow 1a in FIG. 1.

Referring to FIGS. 1 and 1a, there is shown a control member 4 having a plurality of projections 4a, 4b and 4c (the functions of which will be explained in greater detail below). Control member 4 is slidable in a vertical direction, as shown, by pin-and-slot means 4e connecting the member 4 to one camera body (not shown).

Projection 4a includes a pin 4a' engageable in a slot 2a of a main bellcrank lever 2, which main lever is urged in a counterclockwise direction about pivot axis 3 by a tension spring 1. The position of the elements as shown in FIG. 1 is retained by means such as the camera operating release R which engages a lug 4f to hold the control member 4 in the illustrated or cocked position against the force of spring 1.

A camera, according to the embodiment shown, further includes a shutter mechanism comprising a control ring 7 having associated therewith a number of shutter blades 9 (one of which is shown), each blade being pivotable about a fixed axis 10. Shutter control ring 7 is movable in a counterclockwise direction under the force of a spring 8. A plurality of pins 7b fixed to the ring 7, acting through slots 9a of the respective shutter blades 9, controls movement of the shutter blades and pivots the shutter blades 9 (clockwise as shown) under the influence of spring 8 closes the exposure aperture in the center of ring 7.

Ring 7 normally is held against the tension of spring 8 in the position illustrated in FIG. 1 by engagement of a projection 7a on ring 7 with one arm of an intermediate lever 5. Lever 5 is mounted for pivotal movement about fixed axis 6 and is held in the illustrated position by engagement of its other arm with projection 4c on the control member 4.

A shutter blade retaining lever 12 having a projection 12a cooperates with a projection 7c of the ring 7 (in a manner to be explained in greater detail below) to prevent the shutter blades from rebounding after the exposure operation. Lever 12 is urged in a counterclockwise direction about its axis 14 by a torsion spring 13 but is prevented from moving by the engagement of its free end with one arm of an intermediate lever 11. Lever 11 in turn is held in its position by the engagement of its other arm with projection 4b of the control member 4.

Lever 12 also cooperates with a control cam arm 15 mounted for movement with a control gear 15a which operates the shutter for an exposure in a manner known, per se. Control gear 15a meshes with an intermediate gear 22 which in turn meshes with teeth on a rack 21. Rack 21 is slidable along the camera body by pin-and-slot connection 21b and has a pin 21a that is engaged by an arm 2b of the main lever 2.

FIG. 1a illustrates interconnection of the viewing mechanism with the control member 4. A typical viewing mirror 19 to reflect light entering the camera in the direction of arrow 20 from the object is mounted on a base 27 which is pivotal about an axis 18. The base member 27 includes a pin 27a which is positioned within a slot 16b on a two-armed lever 16 to move the mirror in response to movement of lever 16 about an axis 17. The opposite end of lever 16 includes a pin 16a which is engageable in a slot 4d in control member 4 slot 4d being defined by a surface which controls the movement of lever 16, and thereby controls movement of the viewing mirror 19.

The invention operates as follows: In FIGS. 1 and 1a, all functional control means are spring tensioned, for instance, by operation of the film transport mechanism. The swivel mirror 19 is in its viewing position and shutter blades 9 are open to permit free viewing. (It need not be emphasized in this connection that the lens diaphragm now also is open, as diaphragm operation is generally known in reflex cameras and does not form the subject matter of the invention.)

When the camera release member R is actuated to release lug 4f, the lever 2 rotates under the tension of spring 1 counterclockwise about its axis 3, thereby moving the control slider 4 from the cocked position in the direction of arrow A via the pin-slot connection 2a, 4a. The downward movement of the control member 4 from the cocked position in FIG. 1 to the rundown position in FIG. 2 effects the following functions:

First, projection 4c releases the lever 5 which, yielding to the force applied by projection 7a at the shutter control ring 7, is now free to pivot about its axis 6. The shutter control ring 7 moves counterclockwise under the influence of the closing spring 8, thereby moving the blades 9 to their closed positions covering the light aperture. Thereafter, the shutter is closed, as illustrated in FIG. 2.

Figure 2A:
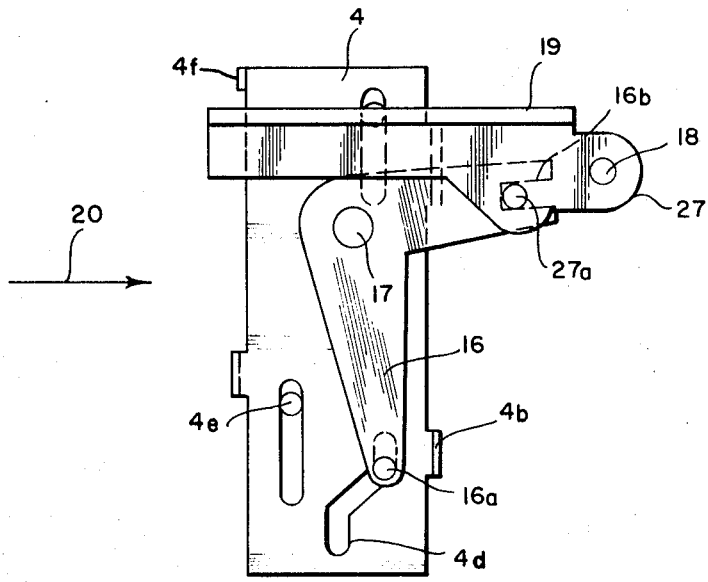
FIG. 2a shows a portion of the arrangement as shown in FIG. 2, taken in the direction of the arrow 2a of FIG. 2.
Figure 2:
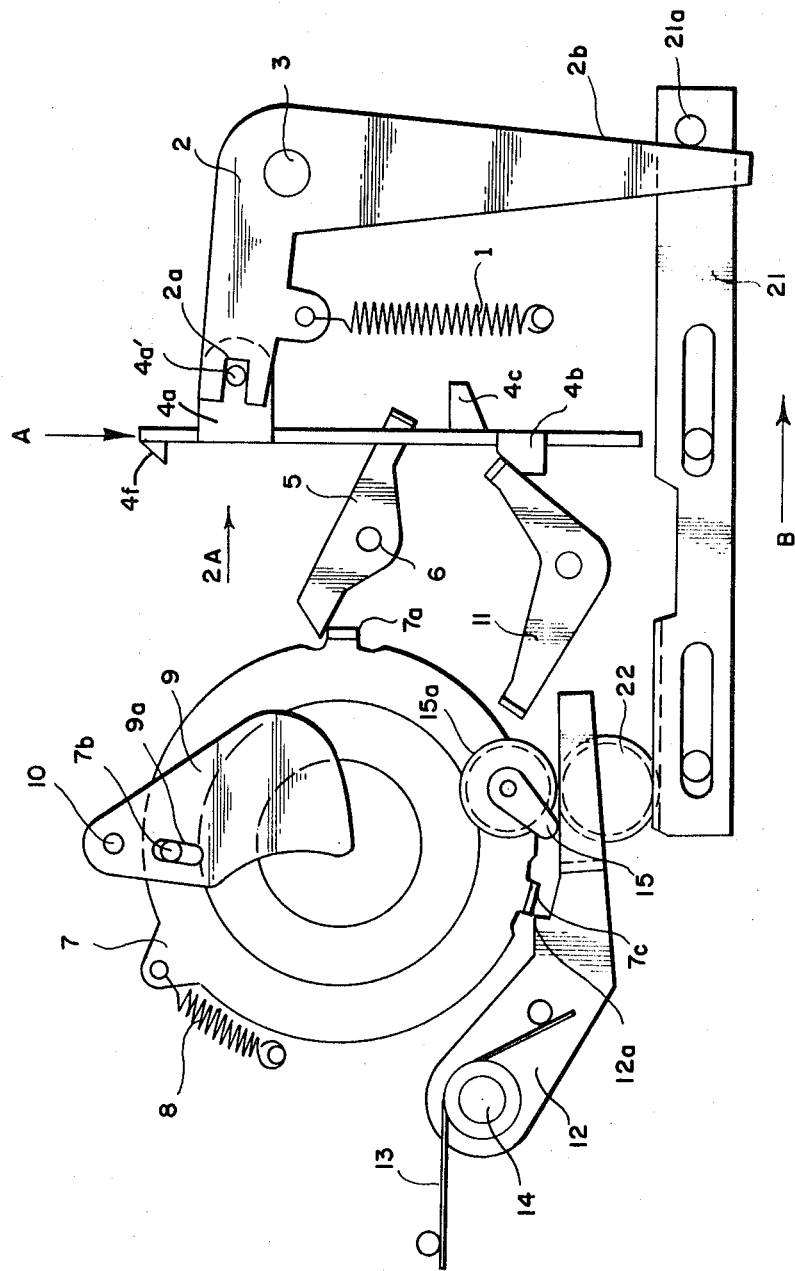
FIG. 2 shows the same arrangement as FIG. 1 but with the various elements in the position just after the control member has been released but before the exposure is made.
Figure 3:
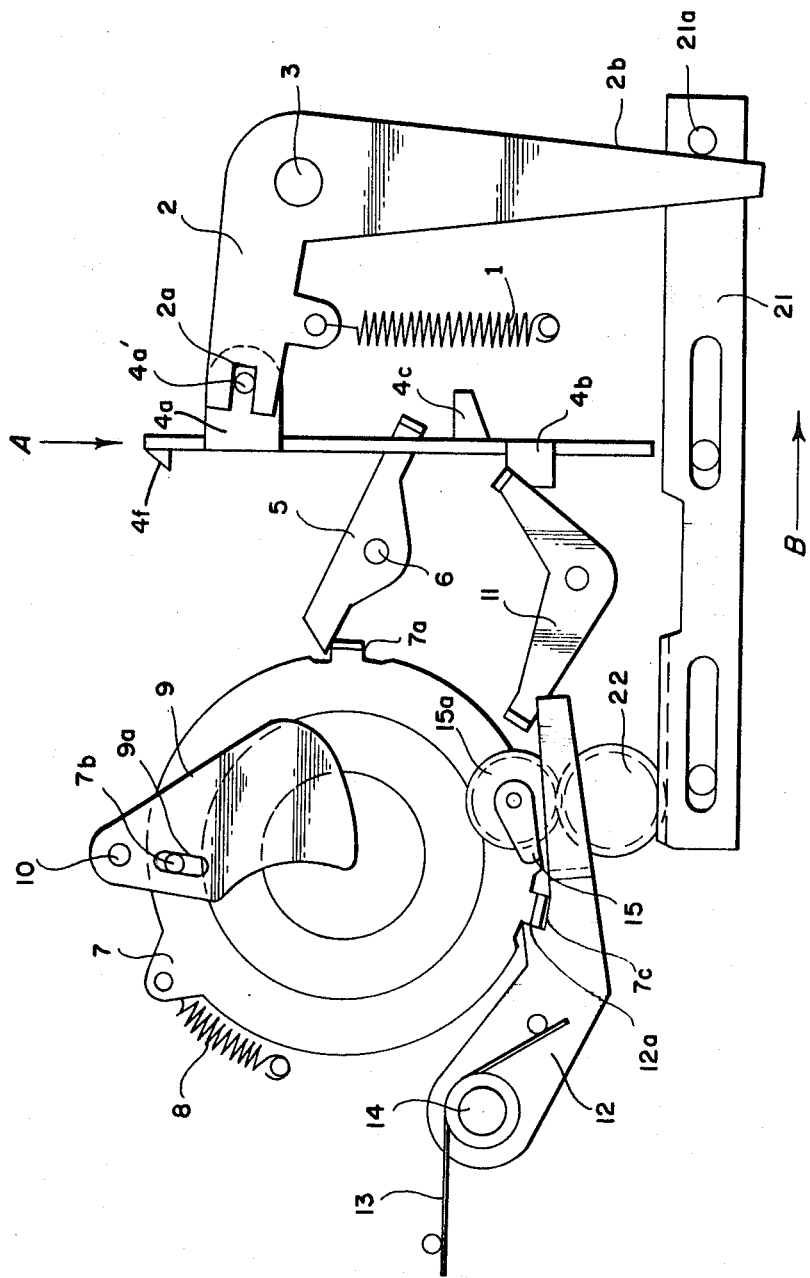
FIG. 3 is similar to FIGS. 1 and 2 but shows the elements after the exposure has been made.

Practically at the same time, lever 11 pivots clockwise with its one arm along the inclined surface of the second projection 4b of the control member 4 to disengage its other arm from retaining lever 12, whereupon the lever 12 is swiveled about its axis 14 under the bias of torsion spring 13 until it engages cam 15 of shutter control gear 15a, as shown in FIG. 2.

The downward movement of control member 4 in the direction of arrow A also pivots lever 16 about its axis 17 via the pin-slot connection 4d, 16a. Consequently, the mirror support 27, is pivoted about axis 18 by the pin-slot connection 16b, 27a to move mirror 19 from its viewing position (FIG. 1a) to the picture taking position (FIG. 2a) to permit light from the object to be transmitted directly to the camera film plane.

After the above steps have been completed as shown in FIGS. 2 and 2a, the camera is ready for shutter release to make an exposure. The shutter release itself also obtains its control impulse from control member 4. When the main lever 2 pivots about its axis 3 from the FIG. 1 position to the FIG. 2 position, pin 21a and thus the rack 21 are rectilinearly displaced in the direction of arrow B by the lever arm 2b. Such displacement causes control gear 15a, disposed at the shutter, to rotate together with its camming arm 15 in the direction of arrow C via intermediate gear 22. Rotation of gear 15a operates the shutter in a known manner to open and close the shutter blades in a predetermined time. Towards the end of the release movement of the whole system after the exposure has been made, the camming arm 15 is disengaged from the retaining lever 12. Projection 12a of retaining lever 12 now is free to engage behind the projection 7c of the shutter control ring 7 as the blades move to their closed position, thereby safely preventing an undesired rebounding of the blades.

While this safeguard against rebounding is defined by the shutter construction and, per se, does not form part of the invention, it is a feature of the invention that the retaining lever is maintained by control member 4 in its inoperative position prior to actuation of the blades, as is evident from FIGS. 1 and 2.

After the exposure has been made, the whole system is reset to its initial position by means (not shown) which move the control member 4 in the direction opposite to arrow A from the rundown position to the cocked position. Such movement may be made with the next film advance operation or by any of the known quick return mechanisms.

During the return movement, retaining lever 12 is moved out of the path of the projection 7c by the projection 4b and the lever 11; mirror 19 is returned to its viewing position by the pin-slot connection 4d, 16a; and the blades 9 then are opened upon rotation of ring 7 by movement of lever 5 in response to projection 4c. Rack 21 may then be returned to its initial position as shown in FIG. 1 upon actuation of the film transport mechanism of the camera.

The invention has been described in detail with particular reference to preferred embodiments thereof, but it will be understood that variations and modifications can be effected within the spirit and scope of the invention as described hereinabove and as defined in the appended claims.

I claim:

1. A single-lens reflex camera for making photographic exposures, said camera comprising:
   a mirror movable between a subject viewing position and a picture-taking position;
   a shutter movable between an open position and a closed position;
   means for retaining said shutter in the closed position, said retaining means having an inactive condition and an active condition, and being movable when in the active condition from a first position to a second position for preventing the rebounding of said shutter from the closed position after the making of an exposure;
   a control member movable from a first position to a second position for effecting the synchronous movement of said mirror, shutter and retaining means;
   said shutter being initially movable from the open position to the closed position in response to movement of said control member from the first control member position towards said second control member position;
   said mirror being movable from the viewing position to the picture-taking position in response to movement of said control member from said first control member position towards said second control member position;
   said shutter being movable from the closed position, to the open position, and back to the closed position to make an exposure subsequent both to the initial movement of said shutter to the closed position and to the movement of said mirror to the picture-taking position; and
   said retaining means being rendered in the active condition in response to movement of said control member towards the second control member position.

2. A camera according to claim 1 wherein:
   said shutter includes a shutter control ring and at least one shutter blade, said ring being movable between a first position wherein said shutter blade is in the open position and a second position wherein said shutter blade is in the closed position; and
   said camera further comprises:
      means biasing said shutter control ring towards the second position; and
      means for releasable holding said shutter control ring in the first position, said ring holding means being movable from a holding position to a releasing position in response to movement of said control member from said first position towards said second position for releasing said shutter control ring for movement to the second ring position under the bias of said biasing means.

3. A camera according to claim 2 wherein:

said control member has a first position; and said releasably holding means is a lever operable by said first portion for releasing said shutter control ring for movement from the first ring position to the second ring position in response to movement of said control member from the first control member position towards the second control member position.

4. A camera according to claim 1 wherein:

said control member further has a third position; and said camera further comprises:

means operable for driving said shutter from the closed position to the open position and back to the closed position to make an exposure; and means for operating said shutter-driving means in response to the movement of said control member towards said third position.

5. A camera according to claim 4, wherein:

said operable means includes a surface movable from a preexposure position to a postexposure position in response to operation of said operable means; and said camera further comprises:

means for urging said retaining means into operative engagement with said surface, said retaining means being movable to the second position in response to movement of said surface to said postexposure position; and means for releasably holding said retaining means in said inactive condition said holding means being movable from a holding position to a releasing position in response to movement of said control member to said second position, whereby said retaining means is rendered in operative engagement with said surface.

6. A camera according to claim 5 wherein:

said shutter-driving means comprises a first gear and said surface is a cam movable in coordination with said first gear; and said means for operating said shutter-driving means is a second gear movable from a first position to a second position in response to movement of said control from the first control member position to the third control member position, for driving said shutter and for effecting movement of said retaining means to the second retaining means position.

7. A camera according to claim 6 wherein:

said control member has a second portion; and said means for holding said retaining means comprises a lever releasably engageable with said retaining means and movable by said second portion from said holding position to said releasing position in response to movement of said control member to said second control member position.

8. A camera according to claim 7 wherein:

said control member is releasable from a set condition to a released condition;

said second gear is a rack movable along a predetermined path between its first and second positions; and said camera further comprises a lever releasable from an energized condition to a deenergized condition in response to release of said control member from said set condition, for moving said rack from the first rack position to the second rack position and for moving said control member to the second and third control member positions.

9. A camera according to claim 1 wherein:

said control member defines a surface for controlling the movement of said mirror, in response to movement of said control member towards said second position; and said camera further comprises a lever engageable with said control surface and displaceable by said surface in response to movement of said control member, for moving said mirror from the viewing position to the picture-taking position.

10. A camera according to claim 1 wherein:

said control member is movable between said first and second positions: and said camera further comprises means for moving said mirror to the viewing position, said shutter to the open position, and for rendering said retaining means in the inactive condition, in response to movement of said control member from the second control member position to the first control member position.